United States Patent [19]

Rodwell

[11] Patent Number: 5,330,244
[45] Date of Patent: Jul. 19, 1994

[54] ADVERTISING BASE AND CLOTHES HANGER CARRIER

[76] Inventor: Donald C. Rodwell, 1201 E. Rancho Dr., Phoenix, Ariz. 85014

[21] Appl. No.: 955,111

[22] Filed: Oct. 1, 1992

[51] Int. Cl.⁵ .......................... A45F 5/00; B60R 7/00
[52] U.S. Cl. .................................. 294/143; 294/159; 224/42.46 A; 223/85; 223/DIG. 4
[58] Field of Search ................ 224/42.46 A, 42.45 A, 224/313; 294/141, 142, 143, 159; 223/85, 94, DIG. 4

[56] References Cited

U.S. PATENT DOCUMENTS

| | | | |
|---|---|---|---|
| 2,344,339 | 3/1944 | Zwald | 224/42.45 A |
| 2,728,503 | 12/1955 | Kramer | 224/42.45 A |
| 2,782,974 | 2/1957 | Borgfeldt | 294/143 |
| 3,226,147 | 12/1965 | Marshall | 224/313 |
| 3,731,809 | 5/1973 | Saenger | 294/143 |

FOREIGN PATENT DOCUMENTS 379542  8/1923  Fed. Rep. of Germany ... 223/DIG. 4

Primary Examiner—Linda J. Sholl
Attorney, Agent, or Firm—Gregory J. Nelson

[57] ABSTRACT

The invention is an advertising base, handle and hanger receiver. The advertising base has a communications area wherein advertising media may be imprinted. The base has a conveniently contoured hand hold cut out so that the base may be comfortably carried in one hand while a plurality of clothing bearing hangers is supported from the advertising base. The base also includes a hanger hook so that the base may be hung on the clothes hanger hook in an automobile or on a clothing support rod in a closet.

5 Claims, 2 Drawing Sheets

ADVERTISING BASE AND CLOTHES HANGER CARRIER

BACKGROUND

1. Technical Field of the Invention

The invention relates to an advertising base on which advertising indicia may be applied. The base is configured to accept one or more clothes hangers, bearing clothing. The base includes a hand grip to comfortably carry the base and the accompanying clothes hangers.

2. Prior Background Art

It is a familiar experience. One goes to a dry cleaning establishment, or laundry, or the like and receives several items of cleaned clothes. Each item is on an individual hanger with a protective covering. When one leaves the store, one may have six or seven hangers held together by a twist-tie and supported by one finger of the hand. Since carrying the group of clothing burdened hangers with one finger is often the only practical way of supporting the clothing items, a strain is produced on the finger of the hand supporting the hangers.

The next problem arises when one arrives at the automobile, or other transport, and seeks to hang the group of hangers from the clothing hook above one of the rear doors of the vehicle. Seldom will a plurality of hangers fit on the small hook available in most vehicles. Hanging only one of the hangers on the vehicle's hook puts the weight supporting burden on the twist-tie holding the group of hangers together. Frequently the tie will separate and permit the clothes to drop to the floor of the vehicle.

This problem of carrying several hangers clogged with clothing in a motor vehicle is often encountered at times other than when one is returning from the dry cleaners. Often one seeks to transport clothing on hangers when going on a short pleasure trip or the like.

It is an objective of the present invention to provide dry cleaning establishments, and the like, with the incentive to supply their customers with a device which will enable them to comfortably carry a plurality of clothes bearing hangers and which will further enable them to conveniently hang this plurality of clothes bearing hangers from the small hook in their motor vehicle or on the hanger rod in their cars. The incentive is provided to the dry cleaner in the form of a communications area on the device which enables the dry cleaning establishment to imprint advertising indicia to communicate to the customer the source of the device.

SUMMARY DESCRIPTION OF THE INVENTION

The invention is a clothes hanger carrier. It is made up of an advertising base which has a first opening for the insertion of a hand therein. Clothes hangers are also hung therefrom. The base has a communication region for the positioning of advertising indicia thereon. The opening in the base has a first boundary contoured to comfortably accept the fingers of a hand, and a second boundary for supporting clothes hangers.

Hanging means are coupled to the base for hanging the base from the clothes hanging hook found in a motor vehicle. The hanging means is coupled to the base for rotating the base from a first plane below the hanging means to a second plane below the hanging means orthogonal to the first plane.

The second boundary of the opening in the base includes contours for engaging with clothes hangers supported there. These engaging contours inhibit slide movement of the clothes hangers along the boundary.

To encourage the free distribution of the invention, the communication region bears indicia identifying the source of the invention.

DETAILS OF BEST MODE FOR CARRYING OUT THE INVENTION

Figure 1:
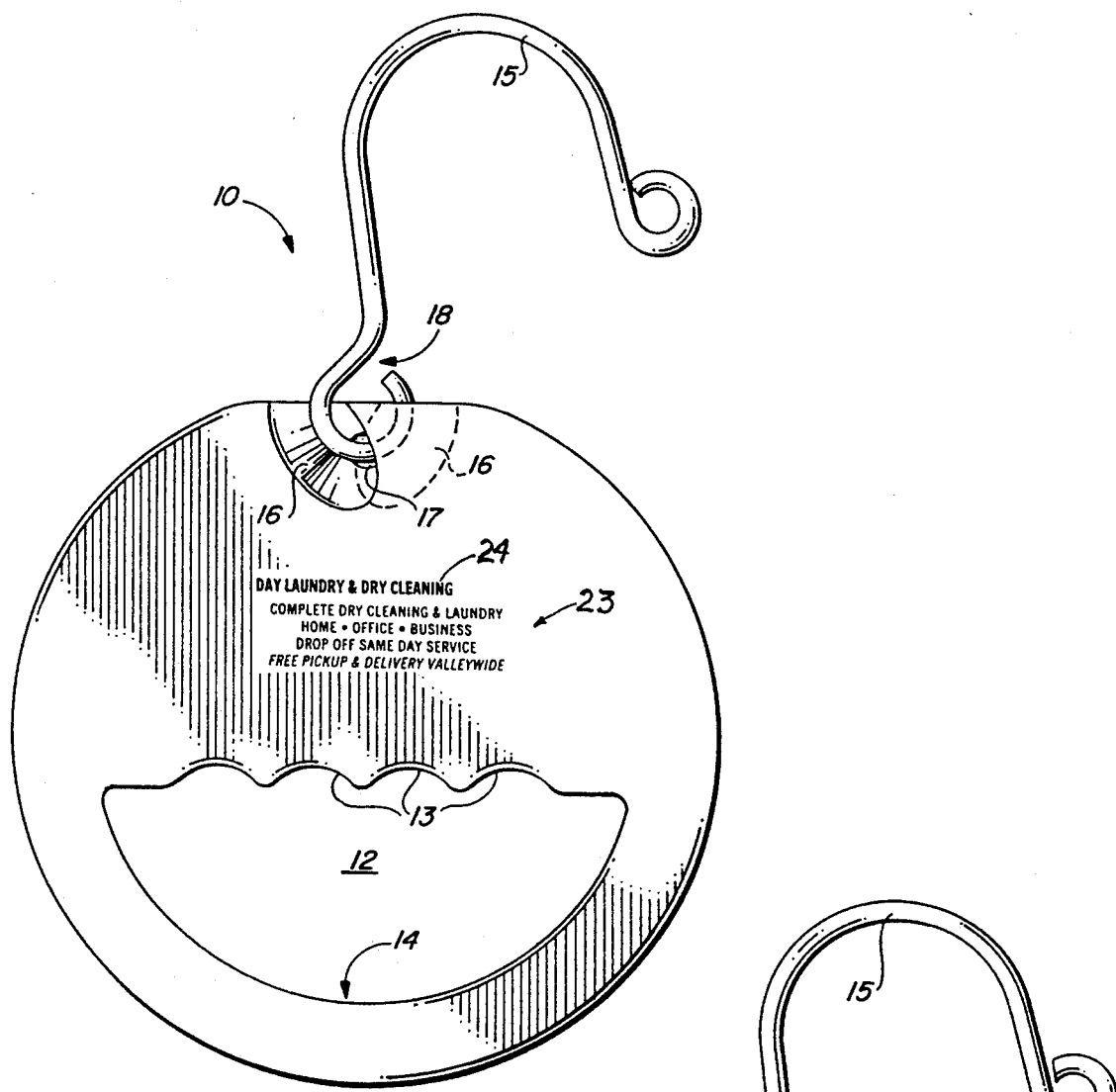
FIG. 1 is an elevation view of the advertising base and clothes hanger carrier of the invention. Shown is a first embodiment of the manner of engaging the hanger with the advertising base.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

In FIG. 1, a presently preferred embodiment of the invention 10 is illustrated. Invention 10 includes an advertising base/handle/clothes hanger receiver 11. Base handle receiver 11 includes a cut out 12 having a finger grip configured upper boundary 13 and a lower boundary 14 from which clothes hangers may be supported.

A hanger hook 15 is coupled to the base handle receiver 11. The lower portion 18 of hanger hook 15 lies in the same plane as hanger hook 15. The lower portion 18 of hook 15 is passed through a bore 17 in base handle receiver 11. Two recesses 16, adjacent bore 17, one on each side of base handle receiver 11, permit the rotation of hanger hook 15 from a plane parallel to the plane of base handle receiver 11 to a plane perpendicular to the plane of the base handle receiver.

Figure 3:
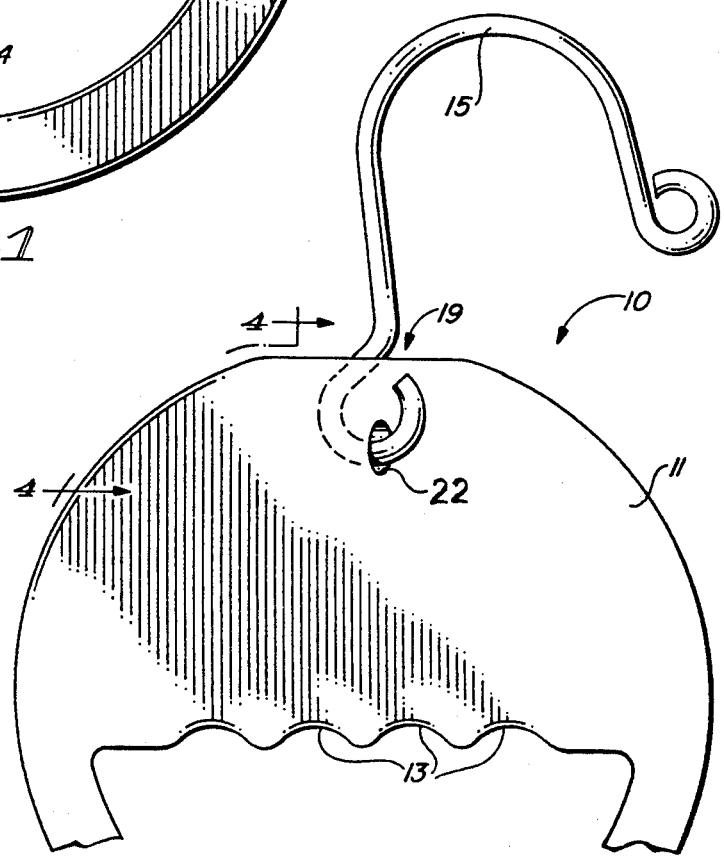
FIG. 3 is a partial elevation view similar to that of FIG. 1 with the exception that the hanger hook is coupled to the advertising base in a manner which limits the hanger hook to lie in either a plane parallel to that of the hanger base or one orthogonal thereto, depending upon the manner in which the hanger hook is formed.
Figure 2:
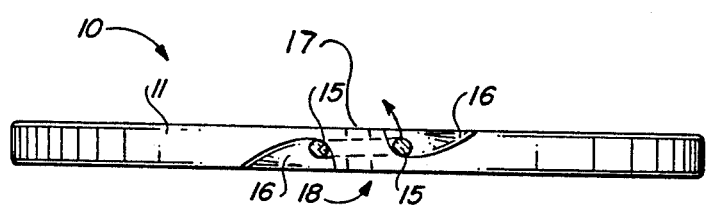
FIG. 2 is a top view of the advertising base of FIG. 1 showing the manner in which the base is structured such that its hanger hook may lie either in the plane of the base or 90 degrees to that plane.
Figure 4:
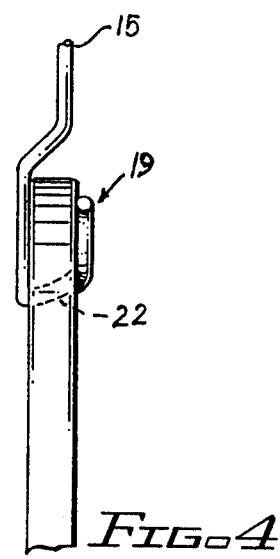
FIG. 4 is a view taken along line 4—4 of FIG. 3 showing the manner in which the hanger hook of FIG. 3 is engaged with the advertising base.

An alternate hanger hook 15 coupling arrangement is illustrated is FIGS. 3 and 4. In FIGS. 3 and 4, hanger hook 15 has a lower portion 19 which has a configuration different than that of lower portion 18 discussed in FIGS. 1 and 2. Base handle receiver 11 has a through bore 22 into which the lower portion 19 of hook 15 is threaded as indicated in those two figures. Unlike the embodiment of FIGS. 1 and 2, the bore 22 will not permit hook 15 to be rotated from the plane of base handle receiver 11 to a second plane orthogonal to the base handle receiver.

The orientation of hanger hook 15 is established by the manner of bending of hanger hook 15 at the time it is coupled to base hanger receiver 11. Thus, hanger hook 15 in the embodiment of FIGS. 2 and 3 may be selectively formed so as to lie in either the plane of base handle receiver 11 or to lie in a plane orthogonal thereto.

It will be understood that hanger hook 15 may be replaced with other hanging means. For example, a flexible loop hanger will permit hanging invention 10 in any orientation below the loop hanger. A latching peg may also be included at the end of the loop hanger so invention 10 may be hung from a bar without opening the loop of the loop hanger.

Figure 5:
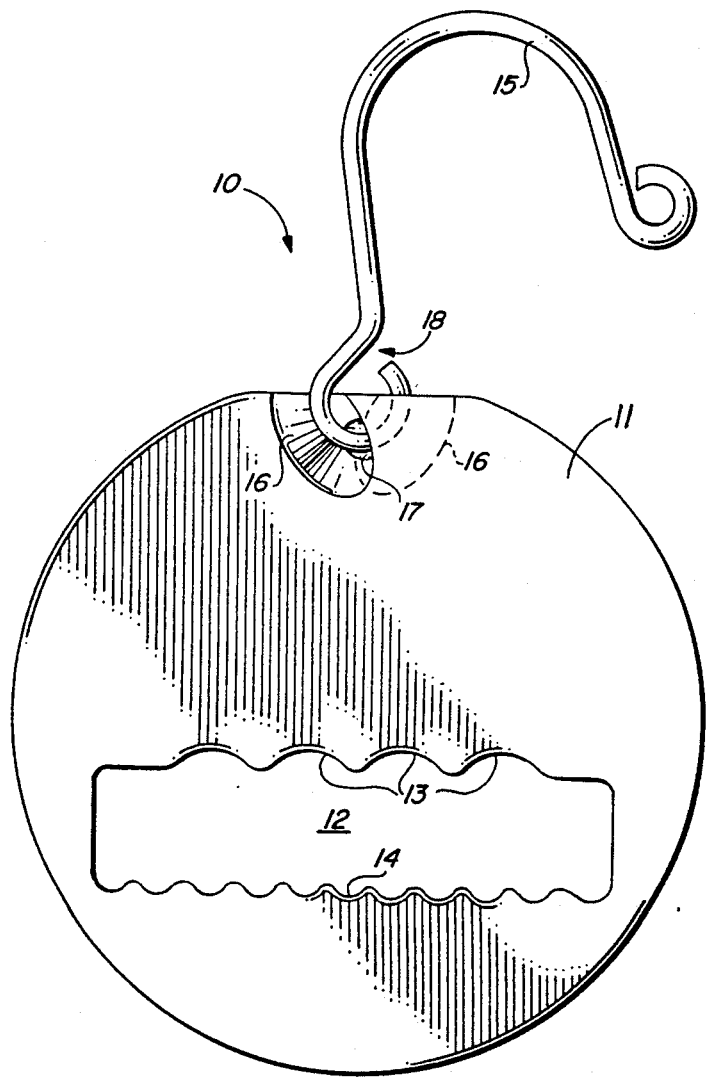
FIG. 5 is similar to FIG. 1 but shows an embodiment in which there is a series of hanger engaging notches for maintaining clothes hangers at generally equi-spaced intervals apart when carried by the advertising base of the invention.

In FIG. 5 another alternative embodiment is shown. Hanger hook 15 is coupled to base handle receiver 11 in the same fashion as indicated in FIG. 1. The primary difference occurs in cut out 12. In FIG. 5 cut out 12 has its lower boundary 14 configured with indentations which will accept the clothes hangers and maintain them in position along the lower boundary 14 of cut out 12. This will tend to keep some space between the hangers and keep all the clothes from sliding toward each other at the middle of cut out 12 and partially crushing some of the newly pressed clothing.

Figure 6:
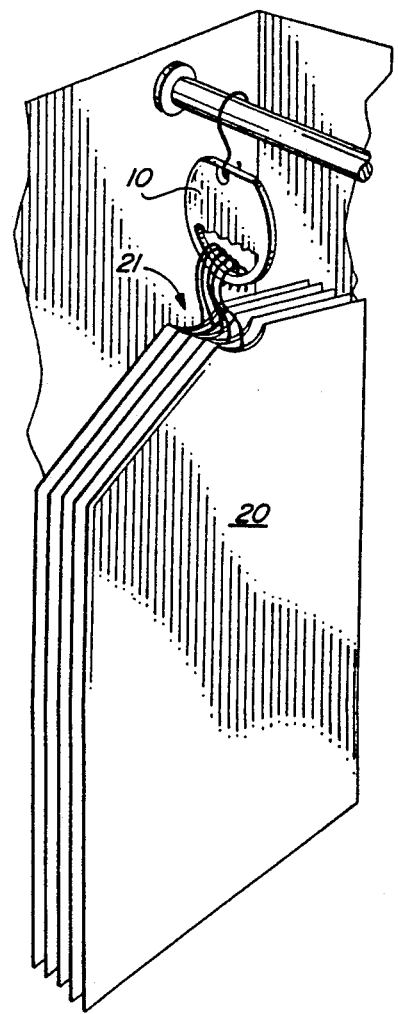
FIG. 6 is a partial perspective view of the invention in use in a clothes closet using the embodiment of FIG. 1.

FIG. 6 illustrates the use of the invention in the embodiment illustrated in FIG. 1 as it is employed to hang the clothing newly returned from the cleaners in a clothes closet. Clothing 20 hangs from a plurality of hangers 21 which hang from the invention 10. The clothing 20 may very well be clothing just returned from the cleaners or it may be clothing assembled prior to going on a trip.

Base hanger receiver 11 includes a communication region 23 wherein the source making invention 10 available may communicate with the person receiving the invention. Communication is achieved by imprinting indicia, e.g. advertising indicia 24, within communication region 23.

What has been disclosed is an advertising base/handle/hanger receiver. The advertising base has a communications area wherein advertising media may be imprinted. The base has a conveniently contoured hand hold cut out so that the base may be comfortably carried in one hand while a plurality of clothing bearing hangers is supported from the advertising base. The base also includes a hanger hook so that the base may be hung on the clothes hanger hook in an automobile or on a clothing support rod in a closet.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, that which is claimed is:

1. A carrier for carrying clothes on a clothes hanger comprising:
    (a) a base having an outer edge and opposite generally parallel surfaces;
    (b) said base defining a region on one surface for placement of informational indicia thereon;
    (c) said base defining an opening and having an aperture disposed above said opening, said opening having a first boundary contoured to comfortably accept the fingers of a hand to enable the user to grasp the carrier and a second boundary for engagement with clothes hangers; and
    (d) hanging means having a hooked-shaped upper end and a hook shaped lower end, which hanger means is directly connected to said base at said lower end which extends through said aperture, said lower end and said aperture being complimentarily arranged so as to permit swiveling of the hanging means from a position generally parallel to the plane of the base to a position generally perpendicular to the plane of the base so that the clothes may be hung on the clothes hanger hook in various positions and to permit the hanging means to be swiveled to an out-of-the-way position adjacent a surface of the base when a user grasps the carrier.

2. The carrier of claim 1 wherein said second boundary of said opening includes contours for engaging clothes hangers supported thereon for restricting sliding movement of said clothes hangers along said boundary.

3. The carrier of claim 1 wherein said informational indicia comprises an advertising message.

4. The carrier of claim 1 wherein said hanging means is coupled to said base so that the base is rotatable below said hanging means.

5. The carrier of claim 1 further including a first recess on one surface of said base at said opening and wherein said lower end of said hanger is free to swivel into and out of said first recess whereby said base is rotatable below said hook-shaped hanger.

* * * * *